Aug. 12, 1969     L. A. CHELMO ETAL     3,460,262
ANGLE MEASURING DEVICE

Filed May 23, 1967     2 Sheets-Sheet 1

INVENTORS
LEON A. CHELMO
JOHN E. SCHUH
BY
Williamson, Palmatier & Bains
ATTORNEYS Aug. 12, 1969   L. A. CHELMO ET AL   3,460,262
ANGLE MEASURING DEVICE Filed May 23, 1967   2 Sheets-Sheet 2

INVENTORS
LEON A. CHELMO
JOHN E. SCHUH
BY
Williamson, Palmatier & Bains
ATTORNEYS United States Patent Office 3,460,262
Patented Aug. 12, 1969

3,460,262
ANGLE MEASURING DEVICE
Leon A. Chelmo, 2621 Major Ave. N., Minneapolis, Minn. 55422, and John E. Schuh, 5301 George Ave. N., Minneapolis, Minn. 55428
Filed May 23, 1967, Ser. No. 640,575
Int. Cl. G01b 3/56
U.S. Cl. 33—174                                    5 Claims

ABSTRACT OF THE DISCLOSURE

A workpiece surface angle inspection tool with tiltable table on a shaft supported on a base and having a pendulum arm engaged at one side by a screw to tilt the table and engaged at the other side by the feeler of a distance measuring dial indicator.

---

This invention relates to an inspection tool and more particularly relates to an inspection tool for determining the angular orientation of workpiece surfaces.

It is oftentimes necessary in manufacturing and machine shop work to determine the angular relationship between two surfaces on a workpiece. The traditional tool used in such an inspection operation is a sine bar with its opposite ends supported at varying heights off a surface plate as to create an angle which may be calculated. The use of a sine bar is extremely time consuming, and the inspection functions in a manufacturing operation can increase the cost of the product, sometimes almost prohibitively.

Although the sine bar facilitates an extremely accurate measurement of the angle in a workpiece, inspection requirements in a manufacturing operation do not always require the use of a sine bar. Some tolerance may be allowable.

An object of the invention is to provide a new and improved device of simple and inexpensive construction and operation for measuring and indicating angles in a workpiece.

Another object of the invention is to provide a novel apparatus for measuring and indicating angles in a workpiece with a minimum of time and effort.

Still another object of the invention is to provide a novel precision apparatus for measuring and indicating angles in a workpiece with a high degree of accuracy as a result of the construction and operation which permits ready and easy detection of common errors, such as deflection, that may occur and simple and rapid correction therefor.

A further object of the invention is to provide an improved precision apparatus for measuring and indicating angles in a workpiece with a high degree of accuracy throughout the long periods of use by minimizing the likelihood of wearing of the parts which are directly related to the accurate measuring and indicating.

A still further object of the invention is to provide a new and novel device with a work table maintained by gravity in an angular position which is to be measured and indicated in relation to the angle in a workpiece.

These and other objects and advantages of our invention will more fully appear from the following description made in connection with the accompanying drawings, wherein like reference characters refer to the same or similar parts throughout the several views, and in which.

Figure 2:
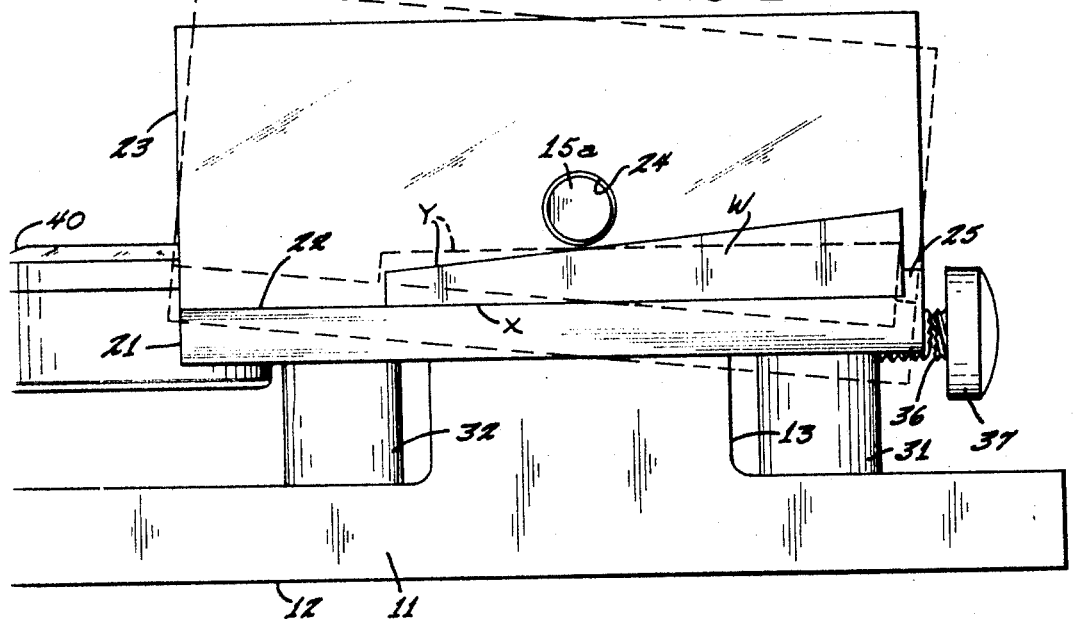
FIG. 2 is a rear elevation view of the invention.

One form of the present invention is shown in the drawings and is described herein.

The workpiece angle inspection tool is indicated in general by numeral 10 and has a base 11 with a planar bottom surface finished to a high degree of smoothness so as to lay flat upon a planar surface plate which is a standard inspection room piece of equipment. The base 11 has an upstanding pedestal 13 formed integrally thereof and disposed substantially centrally between the ends of the base. The pedestal 13 has a bearing aperture 14 extending therethrough and rotatably mounting a shaft 15. The pedestal 13 has a slot 16 therethrough, transversely of the bearing aperture 14 and extending throughout the entire height of the pedestal. At one side of the slot 16, the pedestal 13 is split as at 17 down to the bearing aperture 14 so as to permit application of and release of gripping pressure onto the shaft 15. The front portion of the pedestal is bored at 18, and a locking bolt 19 is mounted therein with a nut 20 thereon which may be readily and easily loosened. When the nut 20 is tightened, the bolt causes the front portion of the pedestal to grip the shaft to prevent rotation of it.

Figure 4:
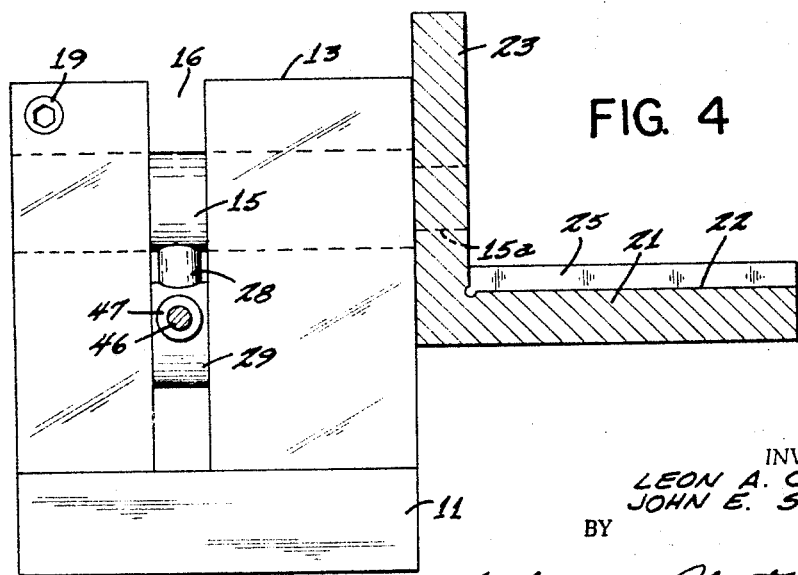
FIG. 4 is a transverse section view taken approximately at 4—4 in FIG. 3.

A workpiece-supporting table 21 has a planar top surface 22 for supporting a workpiece W, seen in FIG. 2, thereon. The table 21 is formed integrally with an upstanding guide member 23, and as seen in FIG. 4, the table 21 and guide member 23 are in right angular relation with each other.

Figure 1:
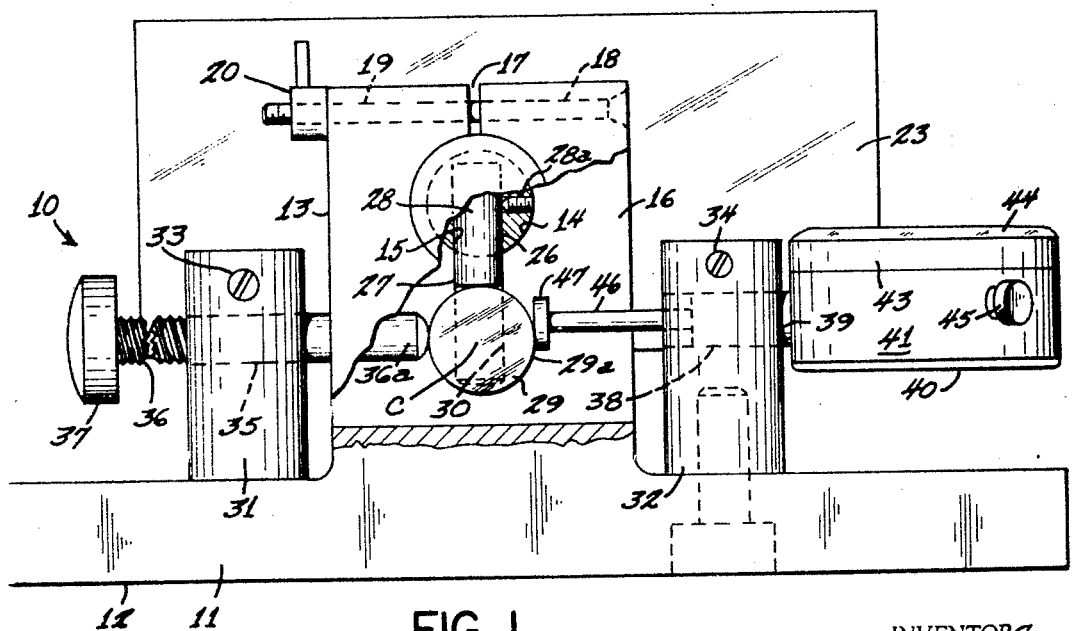
FIG. 1 is a front elevation view of the invention with portions thereof broken away and shown in section for clarity of detail.

The top planar surface 22 on the table lies parallel to the axis of shaft 15 which is parallel to the plane of the bottom surface 12 of the base. The upstanding side member 23 has a mounting aperture 24 receiving the reduced end portion 15a of the shaft which is fitted very closely to the aperture and then welded so as to affix the shaft 15 in predetermined relation to the table 21. It will be noted that the table 21 is asymmetrically arranged with respect to the shaft 15; and the table 21 extends further in one direction than in the other direction. As a result, the weight of the table 21 and of the guide member 23 tends to continuously urge the shaft 15 in a counterclockwise direction as seen in FIG. 2, and a clockwise direction as seen in FIG. 1.

The table 21 is provided with an upstanding stop bar 25 projecting slightly above the top surface 22 of the table at one end to retain the workpiece in stationary condition on the table when the table is tilted.

The shaft 15 has a transverse bore 26 therein for carrying a transversely extending and depending pendulum or arm 27 which consists in a rod 28 secured in the bore 26 by a set screw 28a. At the outer end of the arm 27, a cylindrically shaped pendulum head 29 having an internal bore 30 is mounted on the rod 28 by securing the outer end of the rod in the bore 30, as by an epoxy adhesive. The surface 29a of the cylindrical pendulum head 29 is circular about an axis positioned at a predetermined location exactly one (1) inch from and parallel to the rotation axis of the shaft 15.

Figure 3:
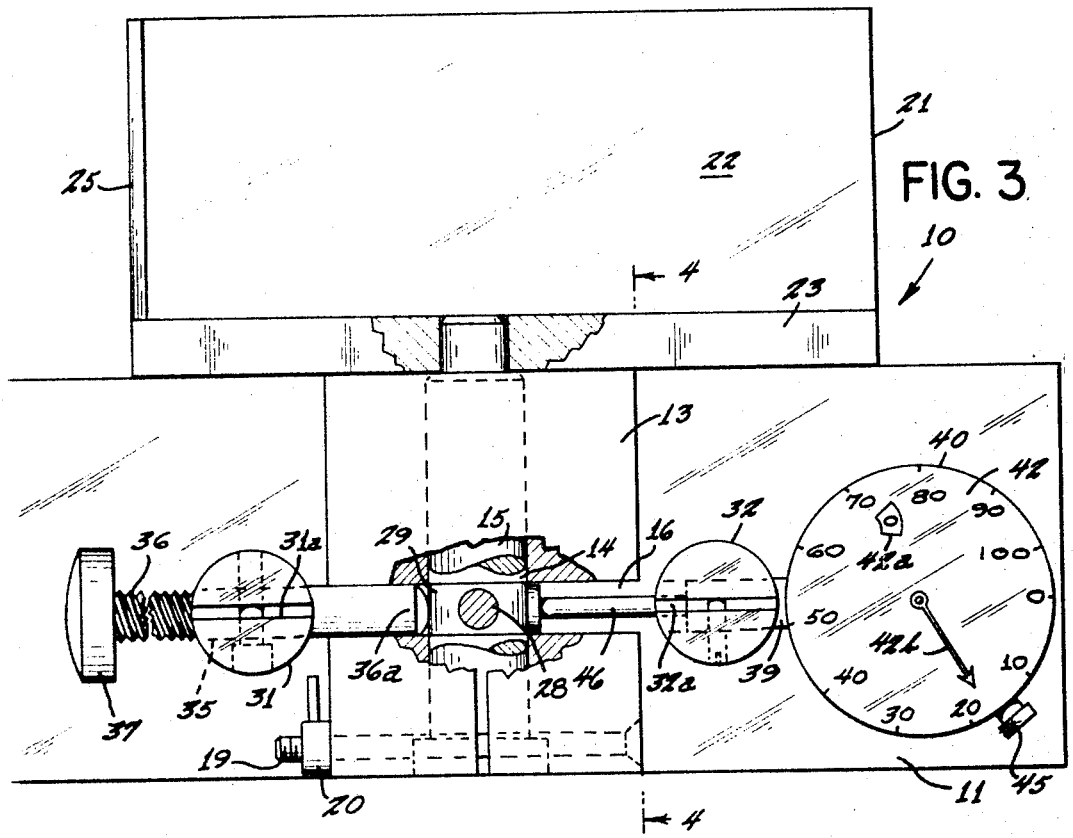
FIG. 3 is a top plan view of the invention with portions thereof broken away and shown in section for clarity of detail.

A pair of rigid upright posts 31 and 32 are affixed on the base 11 adjacent the opposite sides of the slot 16. The posts 31 and 32 have bifurcated upper ends as evidenced by the slots 31a and 32a respectively. These bifurcated upper ends are clamped together as by screws 33, 34 extending transversely therethrough and receiving a table-tilting adjustment screw 36 therethrough. The screw 36 has a knurled end 37 to facilitate hand operation, and the inner end 36a of the screw bears against one side of the depending arm 27. As is clearly evident in FIG. 3, the asymmetric arrangement of the table 22 causes the pendulum head 29 of the arm to be continuously urged against the inner end of the screw 36. Additionally, when the screw has swung the arm 27 in a counterclockwise direction from the position shown in FIG. 1, the tendency of arm 27 to swing downwardly into its natural depending position also contributes materially to the maintaining of the pendulum head in engagement with the adjustment screw.

Adjustment of the screw 33 in the post 31 varies the tightness of fit of the screw 36 within the threaded opening 35. The ease with which the screw 36 may be turned is controlled by the adjustment of the screw 33.

The bifurcated upper portion of post 32 has a transverse bore 38 therein which receives the stem-mounting boss or neck 39 of a distance measuring dial indicator 40. The stem mounting neck or boss 39 is a part of the case 41 of the dial indicator, which has a rotatably adjustable face 42 and mounting ring 43 therefor which also carries a face-confining glass 44. The ring 43 and face 42 maybe affixed in a predetermined orientation on the case 41 by a thumb screw 45 which maybe loosened to permit rotatable adjustment of the face 42. This type of face adjustment is known in the prior art to facilitate a zero (0) setting.

The dial indicator 40 has a feeler stem 46 mounted in and reciprocable in the boss or neck 39, and in a direction normal to the rotation axis of shaft 15, and also parallel to a tangent of the circular arc followed or circumscribed by the center C. It will be remembered that the center C of the pendulum head 29 defines the axis about which the circular side 29a of the pendulum head is formed; and that the center C is disposed at a predetermined distance, in this instance, one (1) inch from the shaft axis.

The stem 46 has a crosshead affixed on the end thereof for engaging the circular side 29a of the pendulum head with a broad range of orientations of the arm 27.

As the arm 27 is swung, the stem 46 is moved a distance which is indicated by the dial indicator 40. When the distance of movement of the stem 46 is known, the angle through which the arm 27 and table 21 have tilted, maybe computed, by referring to a standard sine table. For instance, if the dial indicator 40 indicates that the stem 46 has moved a distance of 0.505 inch, it will be determined from the sine table that the angle through which arm 27 and table 21 have tilted is 30°20′ (thirty degrees, twenty minutes).

In order to read the measurement off the dial indicator 40, the first number is read in the window 42a in the dial face 42, and the second and third numbers are read off the dial face at the location indicated by pointer 42b.

The revolving dial face 42c appearing in the window 42a, and the revolving pointer 42b are connected by linkages within the case 41 directly to the stem 46. A minute spring within the case 41 is provided to urge the stem 46 outwardly and toward the pendulum head 29 with a force of only about one-half (½) ounce. This is in distinct contrast to the heavy loads that maybe carried on the table 21 and which maybe applied by the pendulum head 29 against the inner end 36a of the table tilting adjustment screw 36. In view of the very light contact pressure between the pendulum head 29 and the feeler stem 46, there is practically no possibility of any wear on either the cylindrical surface 29a or the crosshead 47 which might affect the distance measured by the dial indicator 40. The very substantial contact pressure exerted between the pendulum head 29 and the adjustment screw 36 is inconsequential in this construction with respect to the maintenance of accuracy in the measurement of distances. It makes no difference whether there is a substantial wearing at the end of screw 36, because the only function accomplished at this location is the movement of the pendulum head and the swinging of arm 27.

It is important to note that in the event the table 21 carries a workpiece of substantial magnitude, any deflection that might occur, in any of the parts between the table 21 and the pendulum head 29, such as in the shaft 15, may be determined and compensated for.

In operation, the dial indicator 40 is ordinarily adjusted so that when the arm 27 is moved under influence of the adjustment screw 36 as to produce a reading on the dial indicator of 0.000 inch, the plane surface 22 of the table 21 will lie parallel to the surface plate, upon which the base 11 is carried with the finished surface 12 lying flush against said surface plate. The workpiece W is then placed upon the surface 22 of table 21, and ordinarily the workpiece will be moved against the upright angle work surface of the upright member 23. The reference surface X of the workpiece W is laid upon the plane surface 22 of the table. Then the adjustment screw 36 is turned to swing the arm 27 and tilt the table 21 to the dotted line position indicated in FIG. 7 and until the angle surface Y of the workpiece W is indicated to be parallel to the surface plate upon which the base 10 is carried. The parallel relationship between the surface plate supporting base 11, and the angle surface Y of the workpiece W is determined by a supplemental piece of inspection room equipment which is known to persons of skill in the art, and may be referred to as a surface plate indicator and stand which is movable over the surface plate so that the feeler thereon may sense the position of various areas of the surface Y.

When it is determined that the surface Y of the workpiece W lies parallel to the surface plate supporting the base 11, it may be concluded that the angle through which the table 21 has been tilted is the same as the angle between the reference surface X and the angle surface Y of the workpiece W. This tilting of the table 21 will have been caused by swinging of arm 27 and movement of the stem 46 so as to produce an indication at the face of the dial indicator 40 of the distance of travel of the pendulum head 29. This distance of travel is directly proportional to the sine of the angle, and the angle through which the table has been tilted may be determined from a sine table as hereinbefore indicated.

Ordinarily, in checking the surface angles of successive workpieces, it is not necesary to return the table 21 to its original position, but the workpieces may be simply placed upon the table and removed therefrom while the table remains in its tilted position. On successive workpieces, the table may be tilted slightly as indicated to be necessary by the surface plate indicator and stand as the feeler thereof is moved over the angle surface of the workpiece so that the critical angle may be measured through sensing the sine thereof.

In the event that surface angles of a large and heavy workpiece are to be checked, there may be some small deflection of the parts of this tool 10, due to the weight of the part, and possibly due to the imbalance thereof. If, in fact, there is some deflection of parts, it may be improper to assume that the plane surface 22 of the table 21 is in fact parallel to the surface plate supporting base 11 when the dial indicator 40 reads 0.000 inch. In order to correct any deflection that may have occurred, it is desirable to use the surface plate indicator and stand to check the original orientation of the plane surface 22 of the table 21, with the workpiece applied thereon. If it is found that some tilting of the table 21 is necessary in order to obtain a completely parallel relationship between the plane surface 22 and the surface plate upon which the base is supported, then the thumb screw 45 of the dial indicator 40 may be loosened to permit the face 42 to be revolved to a new position so as to obtain a zero (0) setting. Then the thumb screw 45 will subsequently be tightened and the workpiece and table may be tilted as indicated in FIG. 2 until the angle surface is sensed to be parallel to the surface plate on which the base 11 is supported. An deflection that may have occurred as a result of the weight of the workpiece will have been compensated for and the reading measurement obtained will be accurate.

It is further emphasized that even though the workpiece W may have a considerable weight, the contact pressure between the surface 29a of the pendulum head 29, and the crosshead 47 will remain constant at about one-half (½) ounce, and there is no likelihood at all of any deflection in the distance sensing and measuring portion of this tool 10. The contact pressure between the adjustment screw 36 and the pendulum 29 may be very substantial, but it is not relevant to the sensitivity of the tool.

It has been experienced that inspection of angle surfaces in a manufacturing operation has been very substantially speeded up through the use of this present invention. The extremely rapid inspection may be accomplished without loss of the necessary sensitivity or tolerances which have been required.

It will be seen that we have provided a new and improved inspection tool for checking angle surfaces of workpieces in a rapid and improved manner so as to materially increase the productivity of an inspection department and reduce the overall cost of inspection in a manufacturing operation.

Of course it will be understood that various changes may be made in the form, details, arrangement and proportions of the various parts without departing from the scope of our invention.

What is claimed is:

1. A workpiece surface angle inspection tool, comprising a base,
   a horizontal shaft rotatable on the base, a tiltable table affixed on the shaft and having a workpiece supporting plane surface lying parallel to the shaft axis,
   a swingable arm fixed on the shaft and having an end portion, the side of which is circular about a prepositioned axis lying parallel to the shaft axis and at known distance therefrom, said prepositioned axis swinging in a circular arc about the shaft axis,
   a dial indicator affixed on the base and having a reciprocable stem with a feeler end engaging the circular side of the end portion of the arm under a minimum of spring pressure, said stem being oriented to reciprocate in a direction transverse to said axes to sense and indicate the successive positions of said arm as the table is tilted,
   and a table-tilting screw threaded through the base and bearing against one side of the arm in spaced relation to the indicator stem and urging the arm about the shaft axis to tilt the table.

2. The invention according to claim 1 wherein said arm is in depending position when the table is horizontal, the screw pushing the arm upwardly through an arc to tilt the table, and the weight of the arm urging the arm against the screw for controlling table position.

3. The invention according to claim 1 and said table being asymmetrically mounted on the shaft and urging the arm against the screw for accurately maintaining the position of the table under the control of the screw.

4. The invention according to claim 1 and the screw being operable independently of said dial indicator, the dial indicator having an indicator adjustment to provide a zero setting of the indicator independently of the screw to readily compensate for deflection of parts and other variable factors in the operation of the tool.

5. A workpiece surface angle inspection tool, comprising a tiltable table having a workpiece supporting plane surface, a horizontal shaft affixed to the table at an off center location,
   a base having an upright pedestal with a bearing horizontally mounting said shaft, the pedestal having an upright slot exposing a medial portion of the shaft, an arm affixed to said medial portion of the shaft and depending therefrom, the outer end of said arm having one side circular about a prepositioned axis lying parallel to the shaft axis, a pair of upright posts affixed on the base and being respectively positioned at opposite sides of the pedestal adjacent said slot,
   a dual indicator affixed on one of said posts and having a reciprocable stem with a broad feeler end engaging the circular side of the end of said arm, said dial indicator urging said stem against the arm with a minimum of spring pressure, said stem being oriented to reciprocate in a direction transverse to said axes and parallel to a tangent of the arc through which said prepositioned axis swings about the shaft axis to sense the successive positions of said arm as the table is tilted, a table-tilting screw threaded through the other of said posts and projecting into said slot into engagement with the arm and opposite the stem of the said dial indicator.

References Cited

UNITED STATES PATENTS 1,272,997    7/1918    Powell.
2,524,538   10/1950    Pearson.
3,085,345    4/1963    Pearson.

SAMUEL S. MATTHEWS, Primary Examiner